US011881232B2

(12) United States Patent
Han et al.

(10) Patent No.: US 11,881,232 B2
(45) Date of Patent: Jan. 23, 2024

(54) DUAL SPINDLE MOTOR HARD DISK DRIVE

(71) Applicant: Western Digital Technologies, Inc., San Jose, CA (US)

(72) Inventors: Nan-Hsun Han, Santa Ana, CA (US); Brian K. Lee, Yorba Linda, CA (US); Danny J. Kastler, Longmont, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/840,446

(22) Filed: Jun. 14, 2022

(65) Prior Publication Data

US 2023/0142716 A1 May 11, 2023

Related U.S. Application Data

(60) Provisional application No. 63/277,108, filed on Nov. 8, 2021.

(51) Int. Cl.
| | | |
|---|---|---|
| *G06F 1/00* | (2006.01) | |
| *G11B 19/20* | (2006.01) | |
| *G06F 1/3221* | (2019.01) | |
| *G11B 19/28* | (2006.01) | |
| *G11B 21/02* | (2006.01) | |
| *G06F 1/3203* | (2019.01) | |

(52) U.S. Cl.
CPC ........ *G11B 19/2054* (2013.01); *G06F 1/3221* (2013.01); *G11B 19/28* (2013.01); *G11B 21/02* (2013.01); *G06F 1/3203* (2013.01)

(58) Field of Classification Search
CPC ..... G11B 19/2054; G11B 19/28; G11B 21/02; G06F 1/3221

USPC ......................................................... 713/330
See application file for complete search history.

(56) References Cited

U.S. PATENT DOCUMENTS

| | | | |
|---|---|---|---|
| 5,764,430 A | 6/1998 | Ottesen et al. | |
| 6,005,747 A * | 12/1999 | Gilovich | G11B 25/043 |
| 6,590,749 B1 * | 7/2003 | Gill | B82Y 10/00 |
| 6,628,469 B1 * | 9/2003 | Hoyt | G11B 19/02 |
| 7,266,881 B1 * | 9/2007 | Money | G11B 33/1466 427/127 |

(Continued)

OTHER PUBLICATIONS

Israel Patent Office (ISA/IL), PCT International Search Report and Written Opinion for counterpart International application No. PCT/US2022/035036, dated Oct. 26, 2022, 10 pages.

*Primary Examiner* — Volvick Derose
(74) *Attorney, Agent, or Firm* — John D. Henkhaus

(57) ABSTRACT

A dual disk spindle motor hard disk drive includes a first portion having a first spindle motor and a first disk media stack mounted thereon and housed in a first enclosure, and a second portion having a coaxial second spindle motor and a second disk media stack mounted thereon and housed in a second enclosure, where the second portion further includes both the first actuator and head sliders corresponding to the first disk stack as well as the second actuator and head sliders corresponding to the second disk stack. The first and second portions are coupled together such that the open sides of the enclosures mate, referred to herein as a clamshell configuration, and each separate spindle motor is configured to operate independently of the other. With independent control of multiple spindle motors, various control functions may be utilized to address power consumption and temperature control.

20 Claims, 4 Drawing Sheets

(56) References Cited

U.S. PATENT DOCUMENTS

| | | | |
|---|---|---|---|
| 7,305,572 B1 | 12/2007 | Burroughs et al. | |
| 10,332,555 B1 | 6/2019 | Keshavan et al. | |
| 11,062,734 B1 * | 7/2021 | Brand | G11B 5/4813 |
| 11,315,592 B1 * | 4/2022 | Carper | G11B 5/6052 |
| 2005/0036234 A1 * | 2/2005 | Takada | G11B 25/043 |
| 2005/0036244 A1 * | 2/2005 | Carey | G01R 33/093 |
| 2006/0158777 A1 * | 7/2006 | Kim | G11B 17/038 |
| 2009/0013342 A1 * | 1/2009 | Gilovich | G11B 5/4813 |
| 2019/0333533 A1 * | 10/2019 | Mendonsa | G11B 5/4826 |
| 2020/0202891 A1 * | 6/2020 | Mendonsa | G11B 17/038 |
| 2022/0176581 A1 * | 6/2022 | Häupl | B23D 47/12 |
| 2023/0055529 A1 * | 2/2023 | Chen | B23Q 1/5406 |

* cited by examiner

DUAL SPINDLE MOTOR HARD DISK DRIVE

CROSS-REFERENCE TO RELATED APPLICATIONS

This application claims the benefit of priority to commonly-owned U.S. Provisional Patent Application No. 63/277,108 filed on Nov. 8, 2021, the entire content of which is incorporated by reference for all purposes as if fully set forth herein.

FIELD OF EMBODIMENTS

Embodiments of the invention may relate generally to data storage devices, and particularly to a hard disk drive having two disk spindle motors.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

Increasing areal density (a measure of the quantity of information bits that can be stored on a given area of disk surface) is one of the on-going goals of hard disk drive technology evolution. In one form, this goal manifests in the type of high-capacity HDDs that are especially attractive in the context of enterprise, cloud computing/storage, and data center environments. However, the performance of high-capacity HDDs has not necessarily scaled up commensurately with the increases in capacity. This has led to the need to develop and implement various means to increase high-capacity HDD performance.

In recent years the growth in areal density in HDDs has not kept pace with the trends of years past. This has shifted the burden on the mechanics to boost capacity increases by increasing the number of disks within the prescribed form factor. As these HDDs are primarily used for near line storage in data centers in hyper-scale environments, the performance of these high-capacity drives also has to satisfy the IOPs (Input/Output Operations Per Second) density requirements (in some instances, similarly referred to as IOPs/TB) to minimize latency. This demand has led to a shift to multiple actuators for providing parallel access to data.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Figure 1:
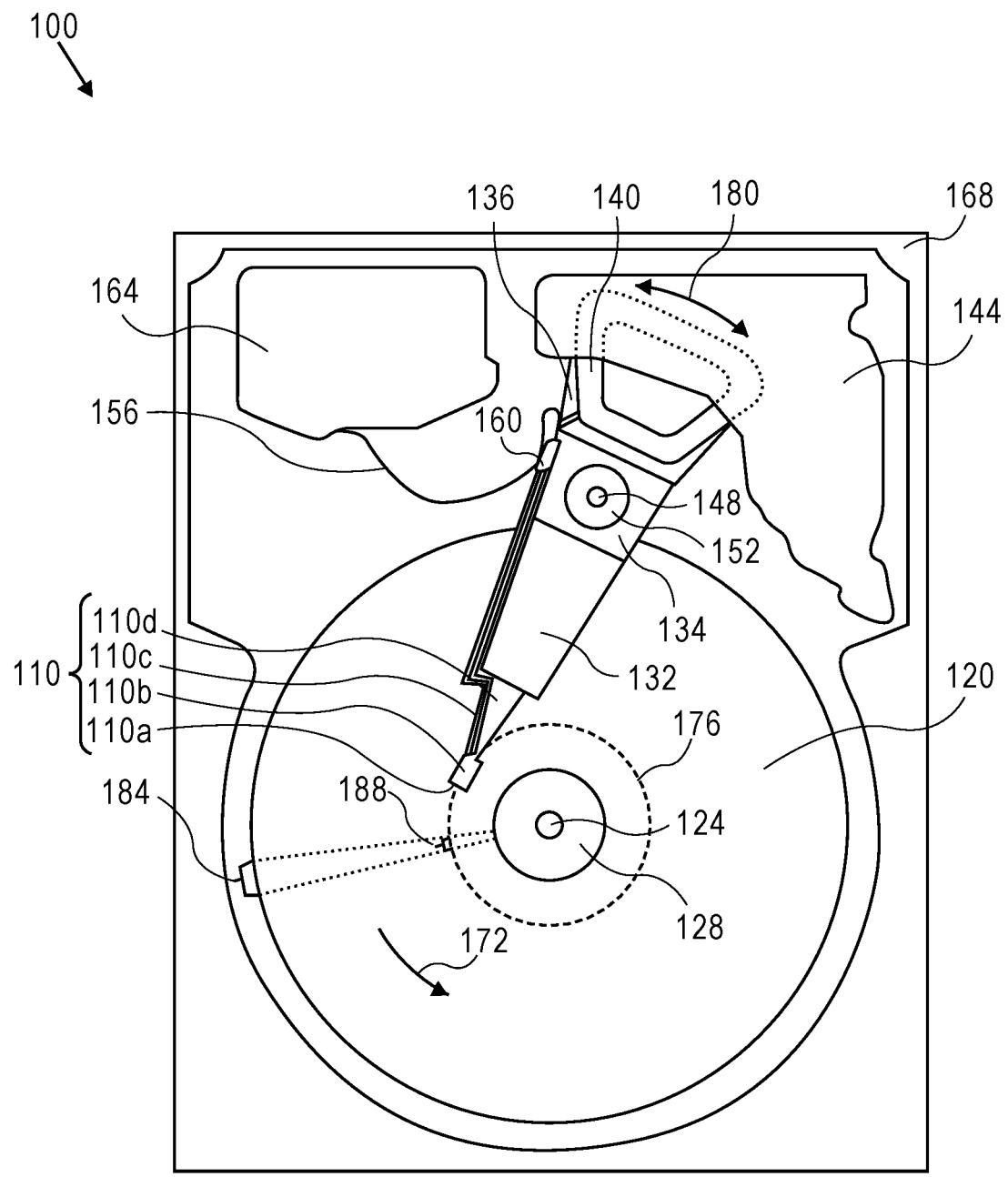
FIG. 1 is a plan view illustrating a hard disk drive (HDD), according to an embodiment.

Generally, approaches to a dual spindle motor hard disk drive are described. The term "spindle motor" is used herein in reference to a recording disk media spindle motor assembly configured to spin the disk media for data read and write operations, such as the drive motor described in reference to FIG. 1. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall the observation that the performance of high-capacity HDDs has not scaled up commensurately with increases in storage capacity. The high latencies of large capacity HDDs in a clustered environment, such as in data centers with multiple clustered nodes, results in a bottleneck due to slower access to stored data. The pressure to increase the performance (e.g., TOPS) by reducing the latencies for data operations of high-capacity HDDs has become even stronger as capacities of HDDs continue to increase. One possible approach to increasing HDD performance is the implementation of multi-actuator systems, in which multiple independently operating actuators are assembled onto a single shared pivot shaft in order to independently and concurrently read from and/or write to multiple recording disks of a disk stack.

Figure 2:
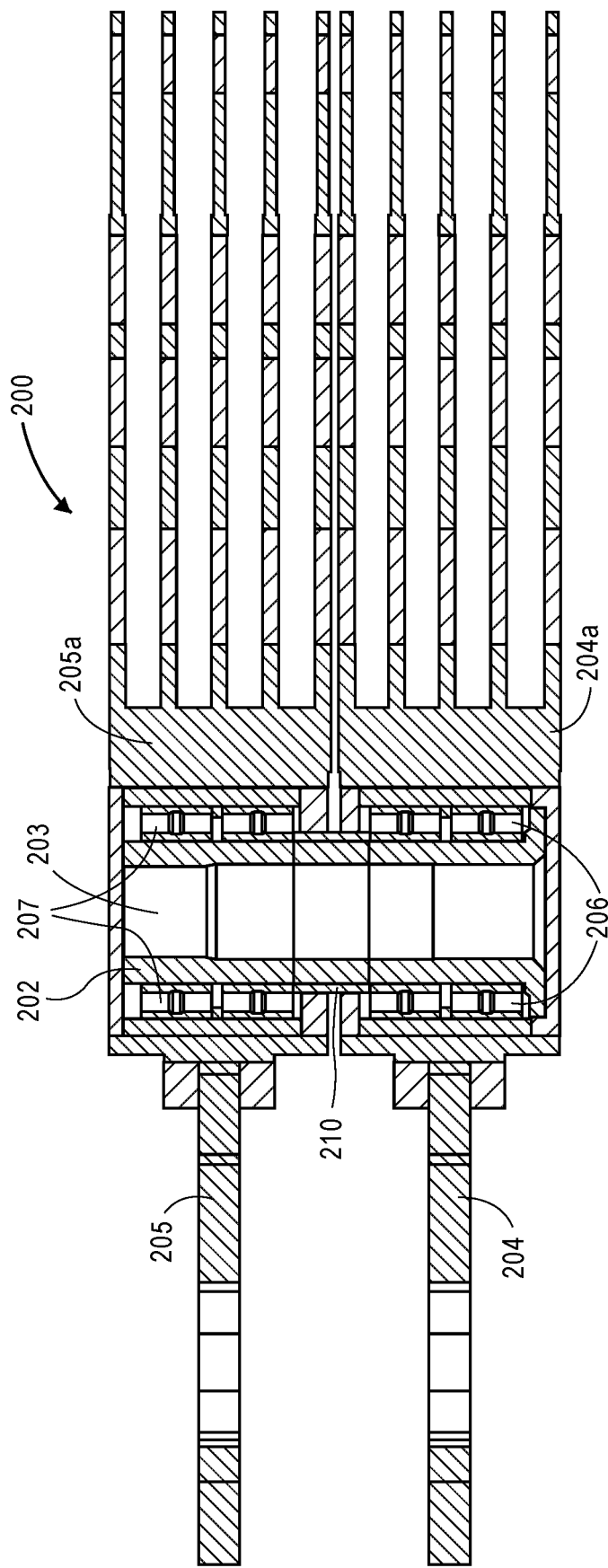
FIG. 2 is a cross-sectional side view illustrating a dual-actuator shared shaft actuator system, according to an embodiment.

FIG. 2 is a cross-sectional side view illustrating a dual-actuator shared shaft actuator system, according to an embodiment. Actuator system 200, generalized, comprises a shaft 202 having a bore 203 at least partially therethrough. According to an embodiment, the shaft 202 is utilized as a pivot shaft, or part of an actuator pivot assembly or shared shaft assembly, for multiple actuators constituent to a multi-actuator shared shaft data storage device such as a hard disk drive (HDD). As such, actuator system 200 comprises the shaft 202, around which a first or lower rotary actuator assembly 204 (e.g., a voice coil actuator, and including a carriage 204a, such as carriage 134 of FIG. 1) is rotatably coupled at a first location of shaft 202, with a lower bearing assembly 206 interposed therebetween, and around which a second upper rotary actuator assembly 205 (e.g., a voice coil actuator, and including a carriage 205a, such as carriage 134 of FIG. 1) is rotatably coupled at a second location of shaft 202, with an upper bearing assembly 207 interposed therebetween. Alternatively and according to an embodiment, the functionality of the shaft 202 utilized as a pivot shaft may be implemented with separate shafts, e.g., one for each respective actuator assembly 204, 205, rather than a shared shaft assembly such as shaft 202. This could provide for decoupling of undesired structural dynamics associated with the independent operation of multiple actuator assemblies, such as actuator assembly 204 and actuator assembly 205, mounted on a single shared shaft.

"Clamshell" Dual Spindle Motor Configuration

Figure 3:
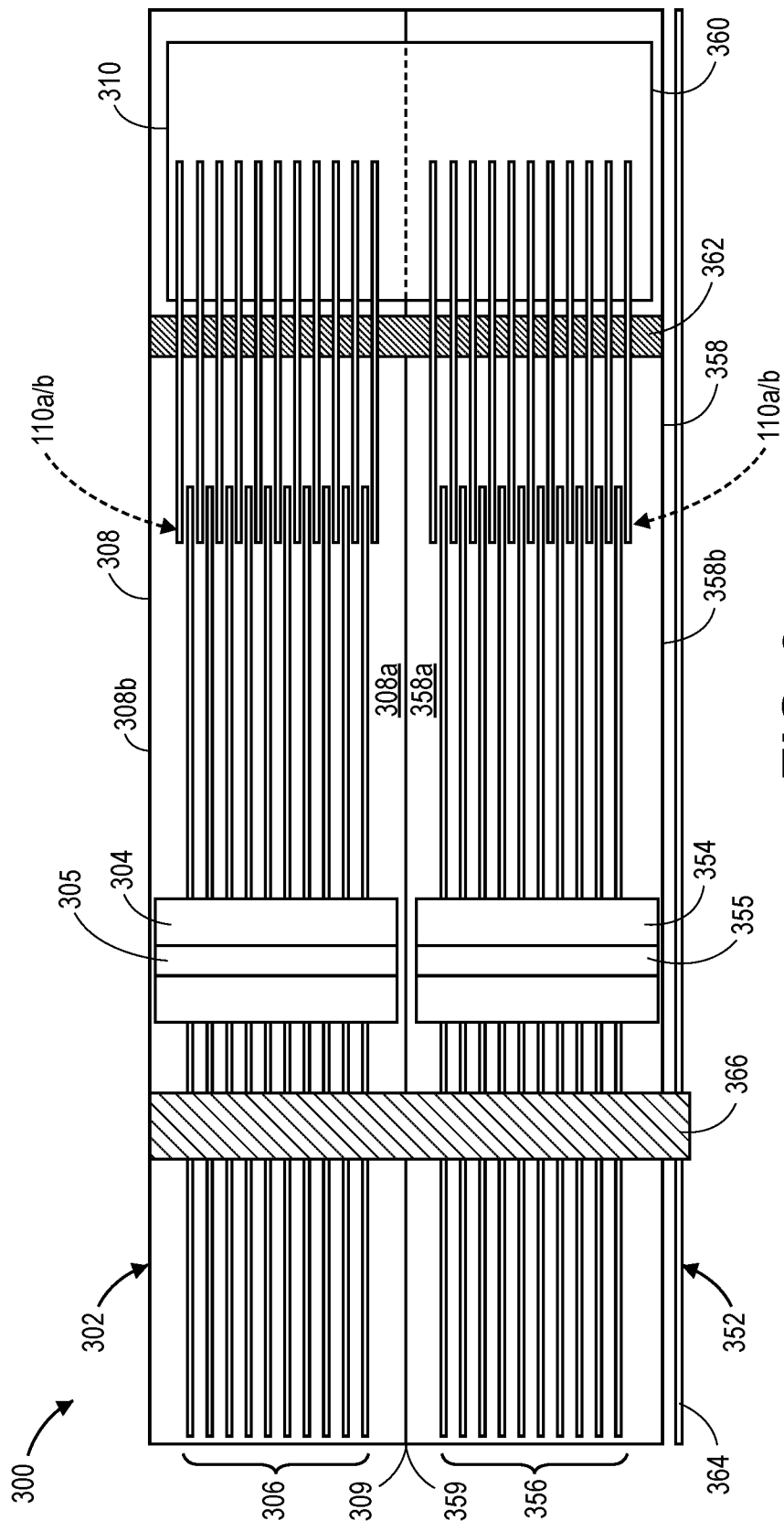
FIG. 3 is a side view diagram illustrating a dual spindle motor configuration for a hard disk drive, according to an embodiment.
Figure 4:
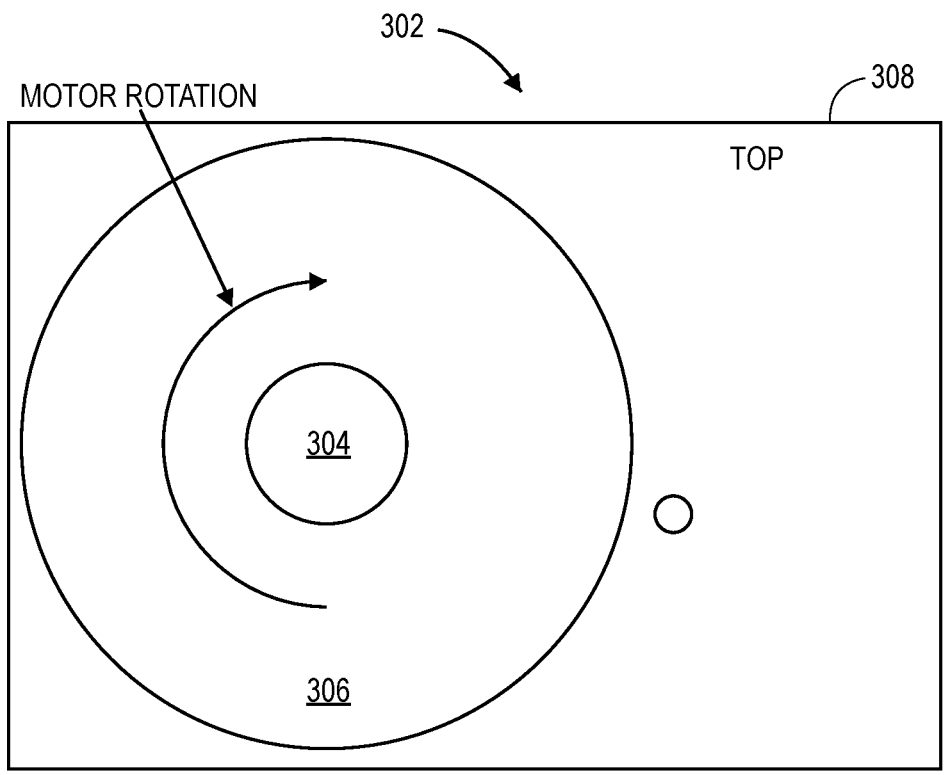
FIG. 4 is a top view diagram illustrating top and bottom portions of the dual spindle motor configuration of FIG. 3, according to an embodiment.
Figure 4:
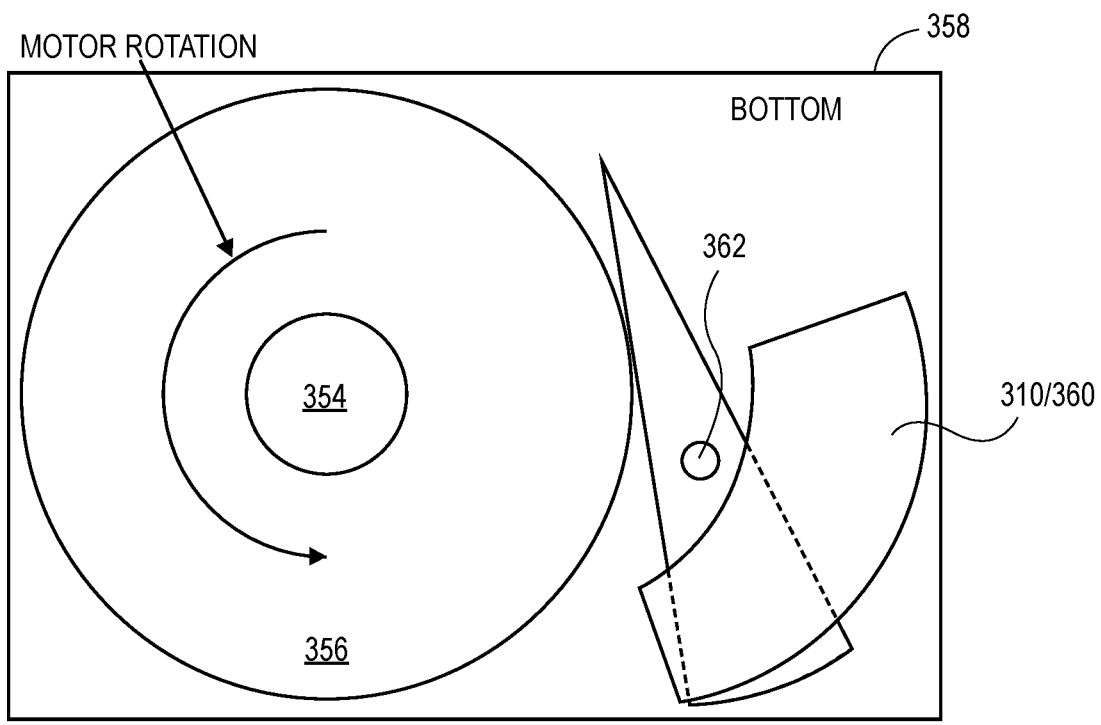

Described herein are approaches to a so-called "clamshell" dual spindle motor design for use in a hard disk drive (HDD), such as data storage device similar to the hard disk drive of FIG. 1. FIG. 3 is a side view diagram illustrating a dual spindle motor configuration for a hard disk drive, according to an embodiment, and FIG. 4 is a top view diagram illustrating top and bottom portions of the dual spindle motor configuration of FIG. 3, according to an embodiment. Dual spindle motor hard disk drive 300 ("HDD 300") is configured as what is referred to as a clamshell HDD 300, in that it comprises two separate portions or parts in which their open sides are coupled together face-to-face, similar to the shells of a clam. However, here, the two portions are not necessarily hinged as with a traditional clamshell. In some embodiments, the two portions may each be a motor base assembly in which a spindle motor is integrated within a base casting, with supportive wiring and mechanical features such as feedthroughs and mounting/sealing structures. In some embodiments, the top portion and the bottom portion may be the same or substantially the same, or have different construction and/or configuration to accommodate various needs such as wiring routing, mechanical dynamics, sealing optimizations, etc.

HDD 300 comprises a first (e.g., top) portion 302 that comprises a first spindle motor 304 and a plurality of (i.e., multiple) first disk media 306 rotatably mounted on the first spindle motor 304. First portion 302 further comprises a first enclosure 308 having an open side 308a and a closed side 308b. HDD 300 further and similarly comprises a second (e.g., bottom) portion 352 that comprises a second spindle motor 354 and a plurality of (i.e., multiple) second disk media 356 rotatably mounted on the second spindle motor 354. Second portion 352 further comprises a second enclosure 358 having an open side 358a and a closed side 358b. The first spindle motor 304 is mounted on or coupled with the first enclosure 308 of the first portion 302 and the second spindle motor 354 is mounted on or coupled with an opposing second enclosure 358 of the second portion 352. As depicted, the first portion 302 and the second portion 352 are coupled together such that the open side 308a of the first enclosure 308 mates with the open side 358a of the second enclosure 358, thus forming the clamshell configuration having coaxial first and second spindle motors 304, 354. First portion 302 and second portion 352 may be coupled together with fasteners, or via welding, and the like, with one or more seal 309, 359 (e.g., a gasket seal) therebetween. The clamshell configuration of HDD 300 may enable the use of a significant amount of existing manufacturing infrastructure, such as tooling and processes, thus providing a feasible and practical dual spindle motor design.

According to an embodiment and as depicted in FIG. 3, the first and second spindle motors 304, 354 have separate and independent but coaxial central shafts 305 and 355, respectively. However, implementation of a shared central shaft that is shared by the first and second spindle motors 304, 354 is contemplated. Regardless, independent central shafts 305, 355 or not, each of the first spindle motor 304 and the second spindle motor 354 is configured for rotating the respective first and second disk media 306, 356 independent of the other, some operational control of which is described in more detail elsewhere herein. Furthermore and as depicted in FIG. 4, the first and second spindle motors 304, 354 are configured to rotate in opposite directions (clockwise versus counter-clockwise) relative to or from the perspective of the open side 308a, 358a of the respective first and second enclosures 308, 358. Hence, when the enclosures 308, 358 are coupled together in a clamshell configuration, the first and second spindle motors 304, 354 are then configured to rotate in the same direction, i.e., as one of the portions such as the top or first portion 302 is now upside-down with its open side 308a now facing downward in the context of FIG. 3.

The second portion 352 further comprises a second plurality of head sliders each housing a read-write transducer (not visible here; see, e.g., slider 110b that includes a magnetic read-write head 110a of FIG. 1) configured to read from and to write to a respective disk medium of the second disk media 356 and a second actuator 360 configured for moving the first plurality of head sliders to access portions of the second disk media 356. According to an embodiment, the second portion 352 further comprises a first plurality of head sliders each housing a read-write transducer (not visible here; see, e.g., slider 110b that includes a magnetic read-write head 110a of FIG. 1) configured to read from and to write to a respective disk medium of the first disk media 306 and a first actuator 310 configured for moving the first plurality of head sliders to access portions of the first disk media 306. Thus, according to this embodiment, while each of the first and second portions 302, 352 comprise a respective disk spindle motor 304, 354 on a respective central shaft 305, 355 and to which the respective first and second disk media 306, 356 are clamped or otherwise coupled, the bottom or second portion 352 of HDD 300 houses and supports both the actuators 310, 360 and head sliders 110a/110b operationally corresponding to both the first and second disk media 306, 356. According to an embodiment and as depicted in FIG. 3, the first and second actuators 310, 360 share a common central shaft 362, while each is configured to operate independently of the other on the respective disk media 306, 356. However, implementation of split or independent central shafts for each respective actuator 310, 360 is contemplated.

While the number of recording disks in disk media 306 and 356 (and the respective supporting heads/sliders) are depicted as equal in FIG. 3, the number of disks in each respective stack of disk media 306, 356 may be different or unequal in various embodiments. Furthermore, various supportive mechanical and electrical structures and arrangements (e.g., motor size) can be tailored to match the different numbers of media in the respective portions first and second portions 302, 352.

According to an embodiment, the second portion 352 further comprises a printed circuit board assembly 364 ("PCBA 364") comprising spindle motor drive(r) electronics (not visible here) for providing electrical signals to the first and second spindle motors 304, 354 to enable them to spin to provide torque to the spindle which is in turn transmitted to the respective first and second disk media 306, 356 affixed to each spindle, and an electrical cable assembly 366 (such as a flexible cable assembly, or "FCA 366") coupled with the spindle motor driver. Here, the second spindle motor 354 of the bottom or second portion 352 may be electrically coupled to the driver electronics as typical and known in the art, while the FCA 366 is routed to and further electrically couples the first spindle motor 304 of the first portion 302 to the driver electronics. Thus, prior to coupling the first portion 302 with the second portion 352, the FCA 366 needs to be electrically connected with the first spindle motor 304 of the first portion 302 of the multiple spindle motor HDD 300.

Operational Control of a Dual Spindle Motor Hard Disk Drive

Processing, functions, procedures, actions, method steps, and the like that are described herein may include enactment by execution of one or more sequences of one or more instructions stored in one or more memory units and which, when executed by one or more processors, cause such performance. Referenced controllers may be embodied in any form of and/or combination of software, hardware, and firmware. An electronic controller in this context typically includes circuitry such as one or more processors for executing instructions, and may be implemented as a System On a Chip (SoC) electronic circuitry, which may include a memory, a microcontroller, a Digital Signal Processor (DSP), an application-specific integrated circuit (ASIC), a Field Programmable Gate Array (FPGA), hard-wired logic, analog circuitry and/or a combination thereof, for non-limiting examples. Firmware, which may be stored in controller memory, includes computer-executable instructions for execution by the controller in operating HDD 300 (FIG. 3).

As introduced, one approach to increasing HDD performance is through the implementation of multi-actuator systems in which multiple independently operating actuators in order to independently and concurrently read from and/or write to multiple recording disks of a disk stack. A dual-actuator or split actuator HDD involves use of dual VCMs (voice coil motor) in order to increase the performance. Furthermore, with a "split single actuator" configuration, the use of only one actuator actively at a time is contemplated. By adding a second motor within the drive and dividing the disks among the motors, finer control over the usage and power consumption of each disk stack is enabled. That is, use of a dual spindle motor design such as dual spindle motor HDD 300 (FIG. 3) can address the increasing power challenges due to increased activity on the media by way of increasing performance using split actuator designs.

Stated otherwise, power consumption can be greatly reduced because part of the drive is not being used at any given time and, therefore, each set of spindle motor and actuator may be independently controlled to operate in a low-power or idle mode or turned off altogether to save power. For example, setting part of the drive into a lower-powered idle mode by parking the actuator and shutting down some of the electronics, while the remaining electronics stay on for any active workloads, may be enabled with HDD 300. Thus, according to an embodiment an electronic controller may be configured to set one of the first and second actuators 310, 360 (FIGS. 3-4) and corresponding first or second spindle motors 304, 354 (FIGS. 3-4) to a low-power (e.g., relative to fully operational power needs) idle mode, e.g., whereby the spindle motor is spinning at a low rotational speed, while the other of the first and second actuators 310, 360 and corresponding first or second spindle motors 304, 354 is simultaneously set to an active (e.g., fully operational) mode. Similarly and according to an embodiment, the electronic controller may be configured to set one of the first and second actuators 310, 360 and corresponding first or second spindle motors 304, 354 to a power-off mode, e.g., whereby the spindle motor is not powered to spin at all (and the corresponding actuator may be parked and corresponding electronics powered down), while the other of the first and second actuators 310, 360 and corresponding first or second spindle motors 304, 354 is simultaneously set to an active (e.g., fully operational) mode. Still further and according to an embodiment, the electronic controller may be configured to set one of the first or second spindle motors 304, 354 to spin at a first rotational speed (or RPM, revolutions per minute) while the other of the first and second spindle motors 304, 354 is simultaneously set to spin at a different second rotational speed. An example application of such a technique would be for surveillance products where the vast majority of the I/O (input-output) activities are sequential WRITE operations, whereby these operations can generally be performed by one half of the HDD 300 while the other half of HDD 300 can stay idle (e.g., spin at a lower speed, or no spin) to reduce power and temperature.

With independent control of multiple or dual spindle motors such as with HDD 300, incoming data may be first stored on half of the drive, such as on the first disk media 306 served by the first spindle motor 304. This would enable the power to the second spindle motor 354 and second actuator 360 to be reduced to a lower idle power (e.g., head parked, spindle revolutions per minute (RPM) reduced) for some part of the HDD 300 life cycle, thereby resulting in reduced power and operational cycles while still maintaining full performance to newer and likely more frequently accessed data. Then, once a sufficient amount of data is accumulated on the drive, data can begin to be stored on the other half of the drive such as on the second disk media 356 served by the second spindle motor 354. When the HDD 300 usage capacity is lower, the drive will be able to use a lot less power to spin-up and operate, with power consumption increasing as capacity approaches the need to spin-up the second spindle motor 354 for example. Thus, according to an embodiment, spin-up of each spindle motor 304, 354 may be based on the current usage capacity of the drive, whereby HDD 300 may be controlled to spin-up only the spindle motor that controls the disk media where data will be written to or read from. Stated otherwise, HDD 300 is controlled to begin to spin-up one of the first and second spindle motors 304, 354 at a first time and begin to spin-up the other one of the first and second spindle motors 304, 354 at a second later time, possibly significantly into the future. When both spindle motors 304, 354 are needed, HDD 300 can also stagger the spin-up of the spindle motors 304, 354 to reduce the 12V (volt) spin-up peaks, thereby enabling HDD 300 to stay under specified power supply limits.

Additionally and according to an embodiment, a dual disk spindle motor such as HDD 300 may be utilized such that as particular data on the drive matures and requires fewer writes to it (e.g., temporally older data), that data can be moved to a certain portion of the first and second disk media 306, 356 (FIGS. 3-4) while allocating the remainder of the disk media 306, 356 for more frequently accessed data. Indeed, it is contemplated that at some point in the use lifetime of HDD 300 it may be configured such that one of the first and second disk media 306, 356 stacks is used for mature data while the other is used for more newer, more operationally active data. Hence, the first or second spindle motor 304, 354 corresponding to the first or second disk media 306, 356 to which the mature data is moved may be set to the first rotational speed less than the second rotational speed to which the other of the first and second spindle motors 304, 354 is simultaneously set.

Typically, power and temperature issues are mitigated by balancing power and performance using various algorithms. In the context of a dual motor HDD such as HDD 300, greater temperature control is also enabled. For example, based on S.M.A.R.T. (Self-Monitoring, Analysis and Reporting Technology) attributes for temperature values or otherwise, responsive to HDD 300 identifying an increase in internal temperature that reaches a predetermined threshold value, HDD 300 can opt to reduce the RPM of one of the first or second spindle motors 304, 354. This response to a temperature rise would thereby enable a non-trivial temperature reduction, such as to the motor base assembly, e.g., the first or second enclosure 308, 358 (FIGS. 3-4).

Additionally, in a scenario in which a dual spindle motor design such as HDD 300 is implemented in combination with data storage devices configured with both SMR (shingled magnetic recording) and CMR (conventional magnetic recording), depending on the need of the customer, having a dual spindle motor design further enables more spindle motor control capabilities that could be taken advantage of to improve power, performance, and reliability of such products. In this context and according to an embodiment, the first actuator 310 and corresponding read-write transducers 110*a* of the first plurality of head sliders 110*b* are configured to read from and to write to the respective disk medium of the first disk media 306 utilizing one of a CMR technology and a SMR technology, while the second actuator 360 and corresponding read-write transducers 110*a* of the second plurality of head sliders 110*b* are configured to read from and to write to the respective disk medium of the second disk media 356 in the other of CMR and SMR technologies.

Thus, the foregoing control functions could be used to generally address the following issues, for non-limiting examples: (i) reduce the power consumption used when only half the disks are needed for reads/writes; (ii) reduce the power consumption used when a known number of disks are less frequently used; (iii) reduce the large 12V spin-up peak that results from pushing capacity by increasing the number of disks on a drive; and (iv) allow for greater temperature control.

Physical Description of Illustrative Operating Context(s)

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable", or "flexible printed circuit" (FPC)). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:
1. A hard disk drive (HDD) comprising:
a top first portion comprising:
a first spindle motor,
a plurality of first disk media rotatably mounted on the first spindle motor, and
a first enclosure having an open side and a closed side; and
a bottom second portion comprising:
a second spindle motor,
a plurality of second disk media rotatably mounted on the second spindle motor,
a first plurality of head sliders each housing a read-write transducer configured to read from and to write to a respective disk medium of the first disk media, a first actuator configured for moving the first plurality of head sliders to access portions of the first disk media, a second plurality of head sliders each housing a read-write transducer configured to read from and to write to a respective disk medium of the second disk media, a second actuator configured for moving the second plurality of head sliders to access portions of the second disk media, and a second enclosure having an open side and a closed side;

wherein the first portion is coupled with the second portion such that the open side of the first enclosure mates with the open side of the second enclosure.

2. The HDD of claim 1, wherein:

the first spindle motor is configured for rotating the first disk media independently of the second spindle motor rotating the second disk media; and the first actuator is configured for moving the first plurality of head sliders to access portions of the first disk media independently of the second actuator moving the second plurality of head sliders to access portions of the second disk media.

3. The HDD of claim 1, wherein:

the first spindle motor is configured to rotate in one of a clockwise or counter-clockwise direction relative to the open side of the first enclosure; and the second spindle motor is configured to rotate in the other of the clockwise or counter-clockwise direction relative to the open side of the second enclosure.

4. The HDD of claim 1, wherein the second portion further comprises a shared shaft to which both the first actuator and the second actuator are coupled.

5. The HDD of claim 1, wherein the second portion further comprises:

a printed circuit board assembly (PCBA) comprising a spindle motor driver; and an electrical cable assembly electrically coupled with the spindle motor driver.

6. The HDD of claim 5, wherein:

the electrical cable assembly is further electrically coupled with the first spindle motor of the first portion.

7. The HDD of claim 1, wherein:

the first spindle motor comprises a first central shaft; and the second spindle motor comprises a second central shaft separate from and coaxial with the first central shaft.

8. The HDD of claim 7, wherein:

the first actuator is configured for moving the first plurality of head sliders to access portions of the first disk media independently of the second actuator moving the second plurality of head sliders to access portions of the second disk media;

the first spindle motor is configured for rotating the first disk media independently of the second spindle motor rotating the second disk media; and the HDD further comprises an electronic controller embodying one or more sequences of instructions which, when executed by one or more processors, cause performance of:

setting one of the first and second actuators and corresponding first or second spindle motors to a low-power idle mode while the other of the first and second actuators and corresponding first or second spindle motors is simultaneously set to an active mode.

9. The HDD of claim 7, wherein:

the first actuator is configured for moving the first plurality of head sliders to access portions of the first disk media independently of the second actuator moving the second plurality of head sliders to access portions of the second disk media;

the first spindle motor is configured for rotating the first disk media independently of the second spindle motor rotating the second disk media; and the HDD further comprises an electronic controller embodying one or more sequences of instructions which, when executed by one or more processors, cause performance of:

setting one of the first and second actuators and corresponding first or second spindle motors to a power-off mode while the other of the first and second actuators and corresponding first or second spindle motors is simultaneously set to an active mode.

10. The HDD of claim 7, wherein:

the first actuator is configured for moving the first plurality of head sliders to access portions of the first disk media independently of the second actuator moving the second plurality of head sliders to access portions of the second disk media;

the first spindle motor is configured for rotating the first disk media independently of the second spindle motor rotating the second disk media; and the HDD further comprises an electronic controller embodying one or more sequences of instructions which, when executed by one or more processors, cause performance of:

setting one of the first and second spindle motors to a first rotational speed while the other of the first and second spindle motors is simultaneously set to a second rotational speed different from the first rotational speed.

11. The HDD of claim 10, wherein the instructions which, when executed by one or more processors, cause further performance of:

moving mature data from one of the first and second disk media to the other of the first and second disk media; and setting the first or second spindle motor corresponding to the first or second disk media to which the mature data is moved to the first rotational speed less than the second rotational speed to which the other of the first and second spindle motors is simultaneously set.

12. The HDD of claim 1, wherein:

the first spindle motor comprises a first central shaft;

the second spindle motor comprises a second central shaft separate from and coaxial with the first central shaft;

the second portion further comprises a shared shaft to which both the first actuator and the second actuator are coupled;

the first spindle motor is configured for rotating the first disk media about the first central shaft independently of the second spindle motor rotating the second disk media about the second central shaft; and the first actuator is configured for moving the first plurality of head sliders about the shared shaft to access portions of the first disk media independently of the second actuator moving the second plurality of head sliders about the shared shaft to access portions of the second disk media.

13. The HDD of claim 1, further comprising:
an electronic controller embodying one or more sequences of instructions which, when executed by one or more processors, cause performance of:
  responsive to receiving data commands involving both the first and second disk media,
    beginning to spin one of the first and second spindle motors at a first time, and
    beginning to spin the other of the first and second spindle motors at a second time after the first time.

14. The HDD of claim 1, further comprising:
an electronic controller embodying one or more sequences of instructions which, when executed by one or more processors, cause performance of:
  responsive to identifying an internal temperature that reaches a threshold value, reducing the rotational speed of one of the first and second spindle motors.

15. The HDD of claim 1, wherein:
the first actuator and each read-write transducer of the first plurality of head sliders are configured to read from and to write to the respective disk medium of the first disk media utilizing one of a conventional magnetic recording (CMR) technology and a shingled magnetic recording (SMR) technology; and
the second actuator and each read-write transducer of the second plurality of head sliders are configured to read from and to write to the respective disk medium of the second disk media in the other of the CMR and SMR technologies.

16. A method of assembling a hard disk drive (HDD), the method comprising:
having:
  a first portion comprising:
    a first enclosure having an open side and a closed side,
    a first spindle motor mounted in the first enclosure, and
    a plurality of first disk media rotatably mounted on the first spindle motor; and
  a second portion comprising:
    a second enclosure having an open side and a closed side,
    a second spindle motor mounted in the second enclosure,
    a plurality of second disk media rotatably mounted on the second spindle motor,
    a first plurality of head sliders each housing a read-write transducer configured to read from and to write to a respective disk medium of the first disk media,
    a first actuator configured for moving the first plurality of head sliders to access portions of the first disk media,
    a second plurality of head sliders each housing a read-write transducer configured to read from and to write to a respective disk medium of the second disk media, and
    a second actuator configured for moving the second plurality of head sliders to access portions of the second disk media;
  positioning the open side of the first portion with the open side of the second portion, such that the first spindle motor and the second spindle motor are coaxial; and
  coupling the first portion with the second portion.

17. The method of claim 16, wherein the second portion further comprises:
  a printed circuit board assembly (PCBA) comprising a spindle motor driver, and
  an electrical cable assembly electrically coupled with the spindle motor driver;
the method further comprising:
prior to coupling the first portion with the second portion, electrically connecting the electrical cable assembly with the first spindle motor of the first portion.

18. A dual-spindle hard disk drive (HDD) assembly comprising:
a top part comprising:
  a first spindle motor, and
  a plurality of first disk media rotatably mounted on the first spindle motor; and
a bottom part with which the top part is coupled, the bottom part comprising:
  a second spindle motor coaxial with the first spindle motor,
  a plurality of second disk media rotatably mounted on the second spindle motor.

19. The dual-spindle HDD of claim 18, wherein:
the top part further comprises a first enclosure having an open side and a closed side;
the bottom part further comprises a second enclosure having an open side and a closed side; and
the top part is coupled with the bottom part such that the open side of the first enclosure mates with the open side of the second enclosure.

20. The dual-spindle HDD of claim 19, wherein:
the first spindle motor is configured for rotating the first disk media in one of a clockwise or counter-clockwise direction relative to the open side of the first enclosure and independently of the second spindle motor rotating the second disk media; and
the second spindle motor is configured to rotate in the other of the clockwise or counter-clockwise direction relative to the open side of the second enclosure.

* * * * *